United States Patent
Hegler

(10) Patent No.: US 8,178,034 B2
(45) Date of Patent: May 15, 2012

(54) METHOD AND DEVICE FOR THE CONTINUOUS PRODUCTION OF A PLASTIC COMPOUND PIPE COMPRISING A PIPE SOCKET

(76) Inventor: Ralph Peter Hegler, Bad Kissingen (DE)

( * ) Notice: Subject to any disclaimer, the term of this patent is extended or adjusted under 35 U.S.C. 154(b) by 0 days.

(21) Appl. No.: 12/529,451

(22) PCT Filed: Feb. 22, 2008

(86) PCT No.: PCT/EP2008/001397
§ 371 (c)(1),
(2), (4) Date: Sep. 1, 2009

(87) PCT Pub. No.: WO2008/104323
PCT Pub. Date: Sep. 4, 2008

(65) Prior Publication Data
US 2010/0102489 A1    Apr. 29, 2010

(30) Foreign Application Priority Data
Mar. 1, 2007  (DE) ...................... 20 2007 002 954 U

(51) Int. Cl.
*B29C 49/04* (2006.01)
(52) U.S. Cl. .................. 264/508; 264/514; 264/40.7
(58) Field of Classification Search .................. None
See application file for complete search history.

(56) References Cited

U.S. PATENT DOCUMENTS

| 5,718,852 | A | 2/1998 | Campbell et al. |
| 6,458,311 | B1 | 10/2002 | Hegler |
| 2006/0001263 | A1* | 1/2006 | Hegler ..................... 285/374 |
| 2007/0222208 | A1 | 9/2007 | Hegler |

FOREIGN PATENT DOCUMENTS

| DE | EP 0 995 579 A2 | 9/1999 |
| DE | 93 21 573 U1 | 1/2000 |
| DE | EP 1 612 030 A1 | 7/2004 |
| EP | 0 681 902 A1 | 5/1995 |

OTHER PUBLICATIONS

International Search Report PCT/EP2008/001397 dated Jun. 27, 2008 (3 pages).

* cited by examiner

*Primary Examiner* — Monica A Huson
(74) *Attorney, Agent, or Firm* — James B. Conte; Husch Blackwell

(57) ABSTRACT

Into a molding path moving in a direction of conveyance is extruded an internal tube from a first extruder and an external tube from a second extruder, the external tube being concentric with the internal tube. During the production of a normal compound pipe, the smooth internal tube is welded together with the external tube which is provided with transverse grooves. At the transition from the normal compound pipe to the expanded pipe socket, the extruder speed of the first extruder is increased from a speed n1,1 to a speed n1,2. During the production of the pipe socket, the speed of the first extruder is reduced to a speed in1,3, wherein n1,2>n1,3>n1,1 applies.

7 Claims, 7 Drawing Sheets

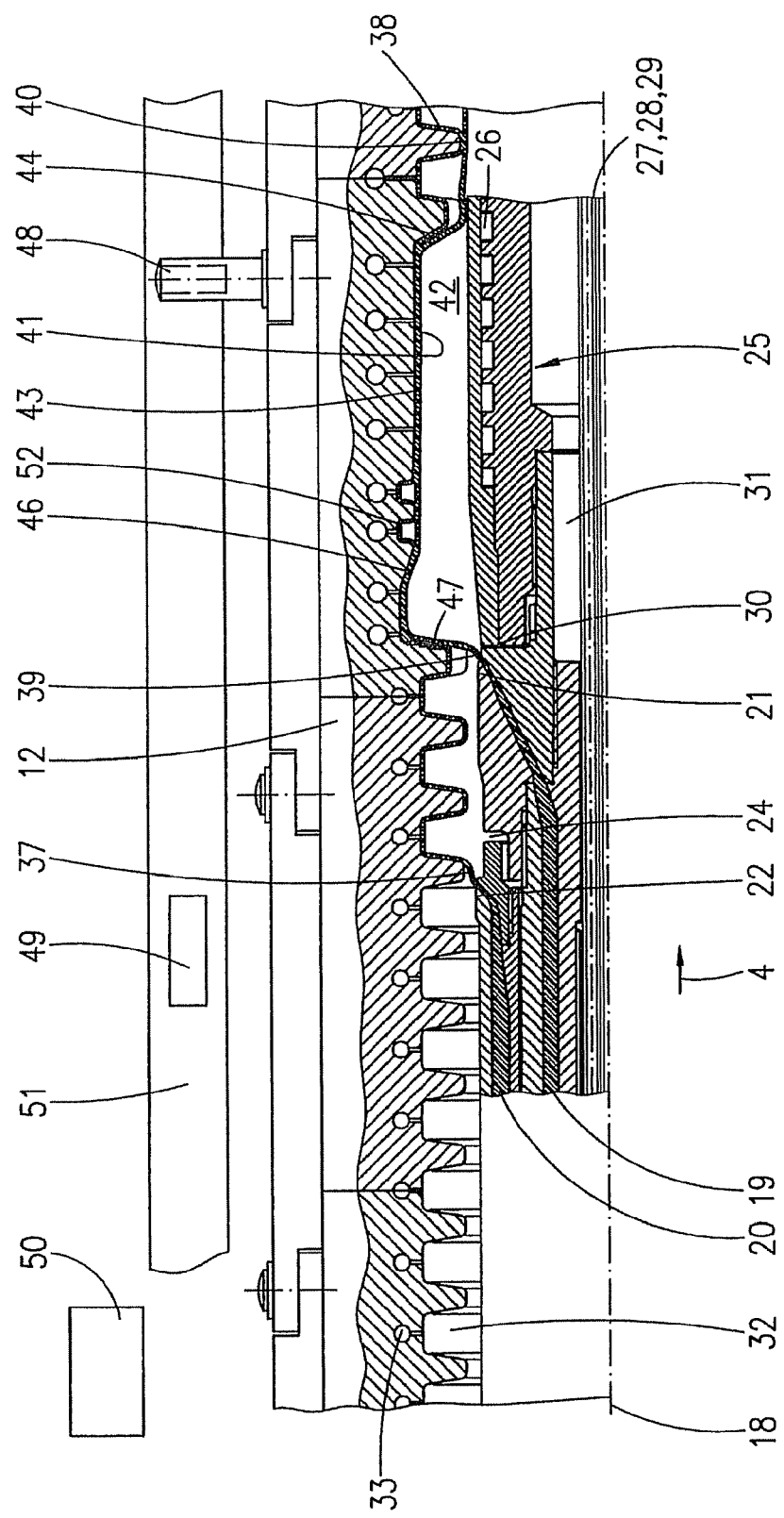

METHOD AND DEVICE FOR THE CONTINUOUS PRODUCTION OF A PLASTIC COMPOUND PIPE COMPRISING A PIPE SOCKET

BACKGROUND OF THE INVENTION

1. Field of the Invention

The invention relates to a method and a device for the continuous production of a plastic compound pipe consisting of a smooth-wall internal tube and a transverse-corrugated external tube welded together therewith, the plastic compound pipe comprising a pipe socket.

2. Background Art

A method of this type and a device of this type are known from EP 0 995 579 A, wherein half shells are arranged on a machine bed for circulation and guidance in a direction of conveyance, which half shells are provided with annular mold recesses and which combine in pairs on a molding path to form a mold with a central longitudinal axis;

wherein at least one pair of half shells is provided with a socket recess;

wherein means are provided for the generation of a relative overpressure acting from the inside to the outside;

wherein a die head of a first extruder is disposed upstream of the molding path;

wherein the die head is provided with an outer die for the extrusion of an external tube, and downstream thereof in the direction of conveyance with an inner die for the extrusion of an internal tube, and with a calibrating mandrel at its downstream end when seen in the direction of conveyance;

wherein the inner die is connected to the first extruder;

wherein a second extruder is provided which is connected to the outer die;

wherein a control system is provided for actuating drive motors of the first extruder and the second extruder.

This known device and the method performed thereon proved to be exceptionally suitable in practical application.

SUMMARY OF THE INVENTION

It is the object of the invention to further develop the known method and the known device in such a way as to improve the production of the pipe socket.

According to the invention, this object is achieved by a method for the continuous production of a plastic compound pipe comprising a pipe socket, the plastic compound pipe consisting of a smooth internal tube and an external tube which is welded together therewith and is provided with transverse grooves, wherein half shells are guided in circulation and in a direction of conveyance, which half shells are provided with annular mold recesses and combine in pairs on a molding path to form a mold with a central longitudinal axis;

wherein at least one pair of half shells is provided with a socket recess;

wherein a relative overpressure is generated which acts from an inside to an outside;

wherein a die head of a first extruder comprising a drive motor is disposed upstream of the molding path;

wherein the die head is provided with an outer die and with an inner die arranged downstream in the direction of conveyance and with a calibrating mandrel at its downstream end when seen in the direction of conveyance;

wherein the inner die is connected to the first extruder;

wherein a second extruder comprising a drive motor is provided which is connected to the outer die;

wherein an internal tube is extruded from the inner die, wherein an external tube of plastic melt is extruded from the outer die;

wherein the drive motors are actuated in such a way that an extruder speed n1 of the first extruder is increased from a speed n1,1 during the production of the compound pipe consisting of a smooth internal pipe and transverse grooves to a speed n1,2 while an expanding transition portion of the socket recess is moving across the inner die; and that the extruder speed of the first extruder is then reduced to a speed n1,3 while the socket recess is being moved across the inner die, wherein n1,2>n1,3>n1,1 applies.

This object is further achieved by a device for performing the method according to the invention for the continuous production of a plastic compound pipe comprising a pipe socket, the compound pipe consisting of a smooth internal tube and an external tube which is welded together therewith and is provided with transverse grooves, wherein half shells are guided in circulation and in a direction of conveyance, which half shells are provided with annular mold recesses and combine in pairs on a molding path to form a mold with a central longitudinal axis;

wherein at least one pair of half shells is provided with a socket recess;

wherein means are provided for the generation of a relative overpressure which acts from the inside to the outside;

wherein a die head of a first extruder is disposed upstream of the molding path;

wherein the die head is provided with an outer die for the extrusion of an external tube and with an inner die arranged downstream in the direction of conveyance for the extrusion of an internal tube and with a calibrating mandrel at its downstream end when seen in the direction of conveyance;

wherein the inner die is connected to the first extruder;

wherein a second extruder is provided which is connected to the outer die;

wherein a control system is provided for the actuation of drive motors of the first extruder and the second extruder;

wherein the control system is configured in such a way that the extruder speed n1 of the first extruder is increased from a speed n1,1 during the production of the compound pipe consisting of a smooth internal pipe and transverse grooves to a speed n1,2 while an expanding transition portion of the socket recess is moving across the inner die; and that the extruder speed of the first extruder is then reduced to a speed n1,3 while the socket recess is being moved across the inner die, wherein n1,2>n1,3>n1,1 applies.

The design according to the invention ensures that at the transition from the normal, transverse-corrugated pipe to the expanded pipe socket, the internal tube does not tear due to the sudden expansion caused by the formation of the substantially cylindrical portion of the pipe socket, with the result that said expanding portion becomes particularly stable. Afterwards, the amount of melt used in the production of the internal tube for forming the cylindrical portion of the pipe socket is reduced again but only to such an amount which lies between that used in the production of the smooth-wall internal tube and that of the greatly expanding transition portion.

A further development of the invention allows the amounts of melt used in the production of the external tube per unit length or time to be varied from portion to portion.

Further features, advantages and details of the invention will become apparent from the ensuing description of an embodiment by means of the drawing.

BRIEF DESCRIPTION OF THE DRAWING

FIGS. 3 to 7 are vertical partial longitudinal sections through the molding machine in various positions of a socket recess relative to the die head during the production of a pipe socket.

DESCRIPTION OF THE PREFERRED EMBODIMENT

Figure 1:
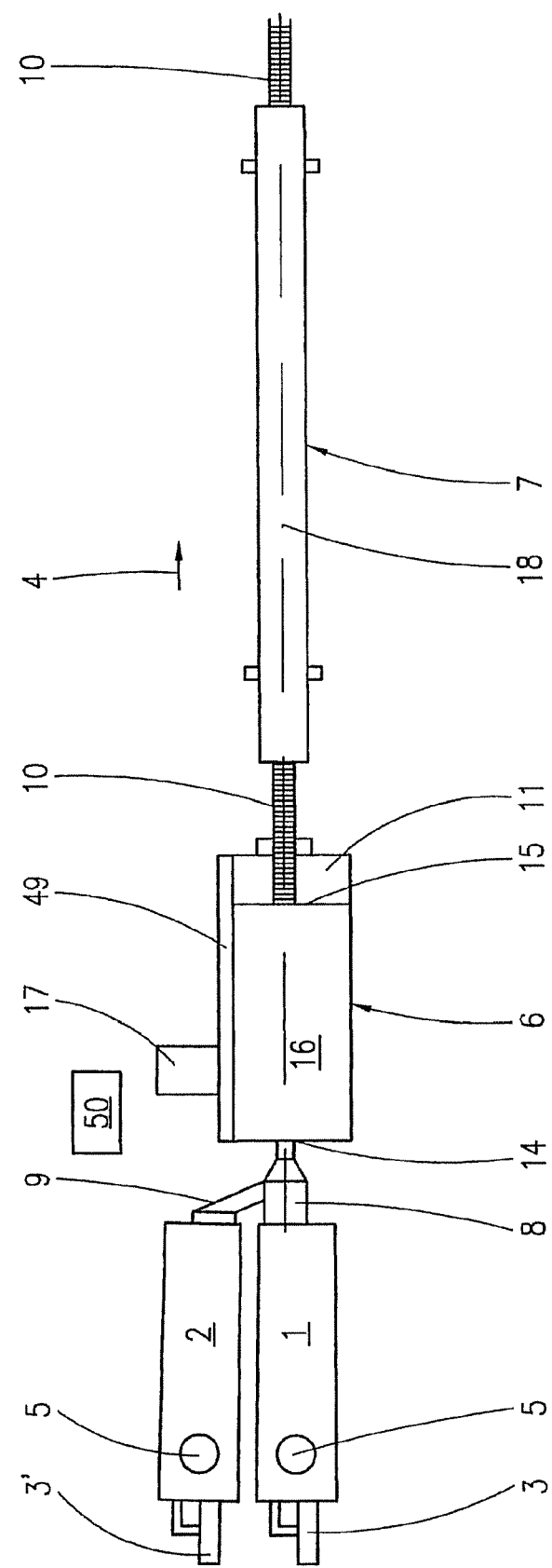
FIG. 1 is a diagrammatic plan view of an installation for the production of compound pipes comprising pipe sockets, the installation substantially comprising two extruders, a molding machine and an aftercooler.

The installation shown in FIG. 1 for the production of compound pipes comprises two extruders 1, 2. These extruders 1, 2 are in each case actuated by a speed-variable drive motor 3 or 3', respectively, which is provided upstream of the feed hoppers 5 of the extruders 1, 2 relative to a direction of conveyance 4 of the entire installation.

Relative to the direction of conveyance 4, a molding machine 6, a so-called corrugator, is disposed downstream of the extruders 1, 2, with an after-cooler 7 being in turn disposed downstream of said corrugator. Mounted on an extruder 1, which is in line with the molding machine 6 and the after-cooler 7, is a crosshead 8 which projects into the molding machine 6. The other extruder 2, which is disposed next to said extruder 1, is connected to the crosshead 8 via an injection channel 9 which opens laterally into the crosshead 8. As diagrammatically outlined in FIG. 1, a compound pipe 10 is molded in the molding machine 6, which compound pipe 10 exits the molding machine 6 in the direction of conveyance 4 and is cooled in the aftercooler 7. Downstream of this aftercooler 7, it may then be cut into pieces of suitable length.

The design of the molding machine 6 is known and common practice. It is described for instance in U.S. Pat. No. 5,320,797 which is explicitly referred to. It substantially comprises a machine bed 11 on which half shells 12, 12' are disposed which are combined to form two so-called chains 13, 13'. At their upstream inlet end 14 and at their downstream outlet end 15 relative to the direction of conveyance 4, these chains 13, 13' are guided over deflection rollers (not shown). When circulating in the direction of conveyance 4, they are guided in such a way that in each case two half shells 12, 12' are combined to form a mold pair, with mold pairs arranged in succession in the direction of conveyance 4 being disposed in closed proximity to each other. The half shells 12, 12', which are combined on a molding path 16 to form mold pairs, are driven by means of a drive motor 17.

The crosshead 8 comprises two melt channels arranged concentrically with a common central longitudinal axis 18, namely an inner melt channel 19 and an outer melt channel 20 which terminate in a downstream inner die 21 or a downstream outer die 22, respectively, relative to the direction of conveyance 4. The inner melt channel 19 is connected to an injection channel 23 of the extruder 1 which is in line with the molding machine 6 while the outer melt channel 20 is connected to the injection channel 9 of the other extruder 2. Between the inner die 21 and the outer die 22, a gas duct 24 projects out of the crosshead 8, the gas duct 24 being connectable via a valve to a compressed gas source for the injection of so-called intermediate air on the one hand or, on the other hand, to atmosphere or a partial vacuum.

At the downstream end of the crosshead 8 relative to the direction of conveyance 4, a calibrating mandrel 25 is mounted on the crosshead 8, the calibrating mandrel 25 extending concentrically with the axis 18 as well. It comprises cooling channels 26, through which cooling water is guided which is supplied via a cooling water feed line 27 and discharged via a cooling water return line 28. Furthermore, an air line 29 is provided which is connected to a gas gap 30 which serves as an additional gas duct and which is situated immediately downstream of the inner die 21 between the crosshead 8 and the calibrating mandrel 25 relative to the direction of conveyance 4. The lines 27, 28, 29 pass through an approximately tubular supply channel 31 which is formed concentrically with the axis 18 in the crosshead 8.

The half shells 12, 12' have annular mold recesses 32 which are disposed in succession at regular distances and which are in each case connected to partial vacuum channels 33. When the half shells 12, 12' enter the molding path 16, the partial vacuum channels 33 come into contact with partial vacuum supply sources 35 or 36, respectively, as shown in FIG. 2 so that a partial vacuum is applied to the mold recesses 32.

The plastic melt supplied to the crosshead 8 by the extruder 2 through the injection channel 9 flows through the outer melt channel 20 to the outer die 22 where it is extruded to foam an external tube 37. Due to the partial vacuum, this tube 37 comes into contact with the mold recesses 32, thus forming a tube provided with transverse grooves 38. Plastic melt from the extruder 1 is supplied to the crosshead 8 via the injection channel 23 and flows through the inner melt channel 19 towards the inner die 21 where it is discharged as an internal tube 39 which reaches the calibrating mandrel 25. This calibrating mandrel 25 expands slightly outwards from the inner die 21 in the direction of conveyance 4 until the internal tube 39 comes into contact with the corrugation troughs 40 of the external tube 37 where it is welded together with the external tube 37. Once cooled and solidified, the internal tube 39 and the external tube 37 form the compound pipe 10.

Figure 2:
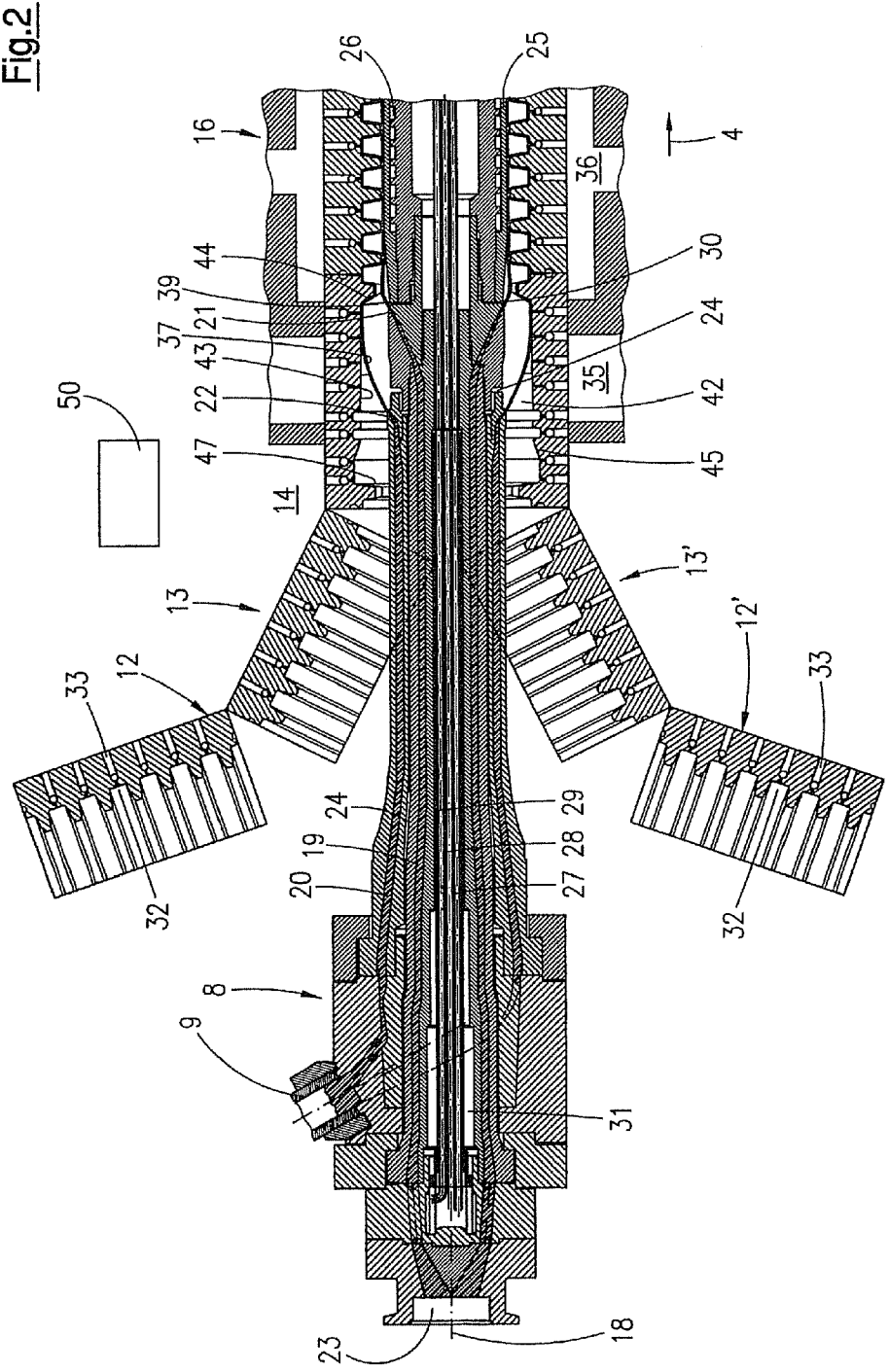
FIG. 2 is a horizontal section of a die head and of the inlet end of the molding machine.
Figure 3:
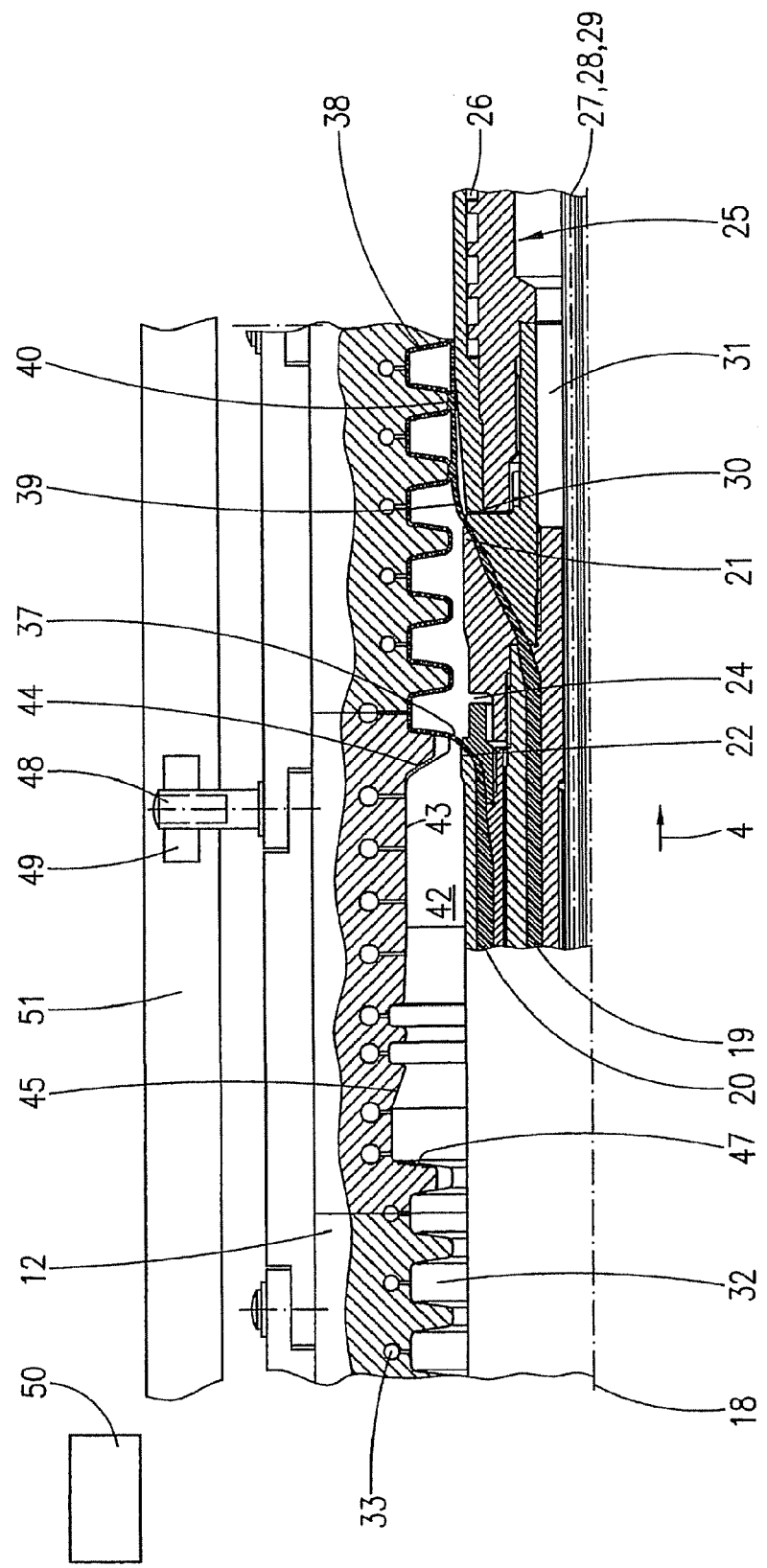
Figure 4:
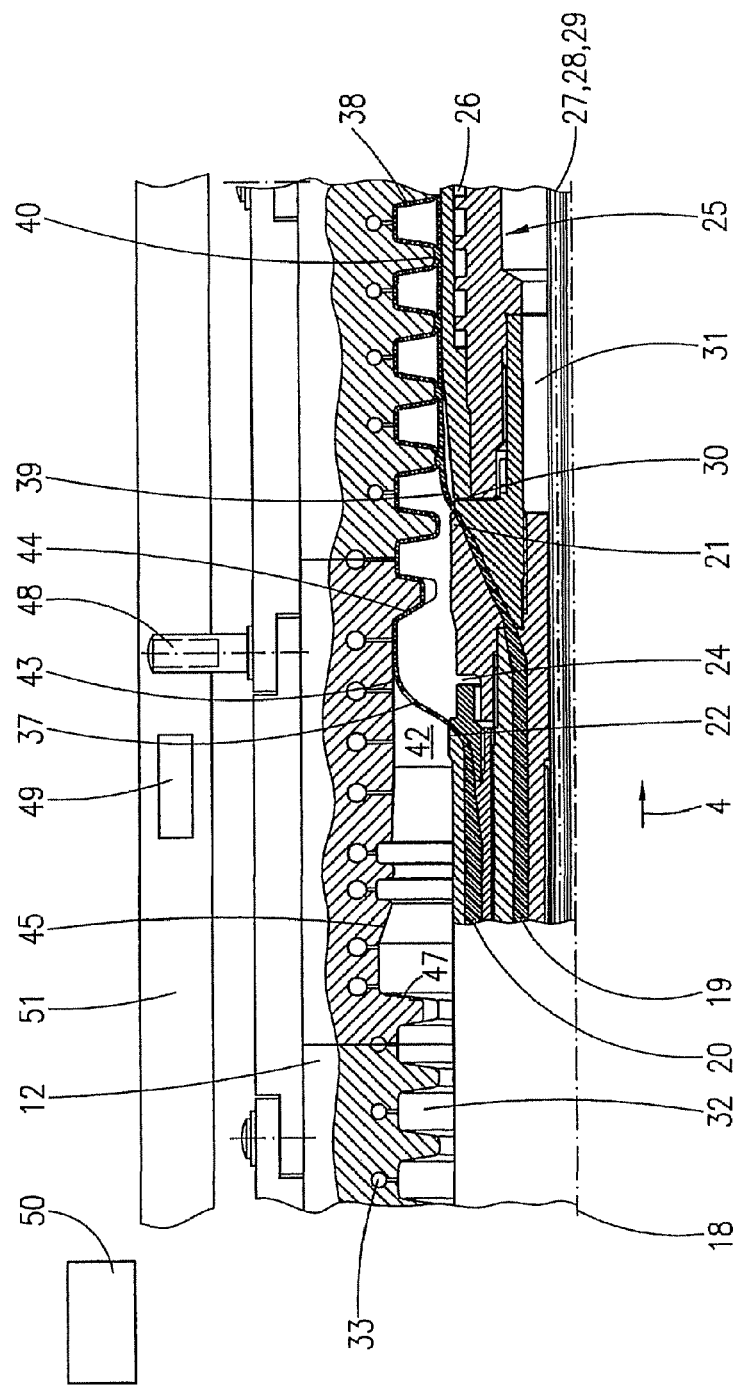

As shown in particular by FIGS. 2, 3, 4, the half shells 12, 12' are designed such that pipe sockets 41 are in each case formed at given intervals in the endlessly produced compound pipe 10. To this end, a substantially cylindrical socket recess 42 having a substantially smooth cylindrical wall 43 is formed in a pair of half shells 12, 12'. A transition portion 44 is formed between the wall 43 of the socket recess 42 and the mold recess 32 which leads in the direction of conveyance 4. When seen in the direction of conveyance 4, the trailing end of the wall 43 of the socket recess 42 is adjoined by a frusto-conical mold portion 45 in which is molded an outwardly expanding insert end 46 of the socket 41. Said mold portion 45 is in turn adjoined by a transition portion 47 which leads to the next mold recess 32 arranged downstream in the direction of conveyance 4.

Connected to the corresponding half shell 12 in a spatially defined allocation to the socket recess 42 is a rod-shaped switching member 48 which triggers—in a switch which is stationary relative to the machine table 11—the release of a reference signal in a manner yet to be described, which signal is transmitted to a central, freely programmable control system 50 which in turn controls the rotational speed—hereinafter referred to as "speed"—of the extruders 1, 2 and therefore the extrusion rate thereof by means of this signal. Said control system 50 also controls the supply of the gas duct 24 and the gas gap 30. The switch 49 is mounted to a retaining arm 51 which is in turn mounted to the molding machine 6 above the half shells 12, 12'.

During the production of the normal corrugated compound pipe 10 in the shape shown on the right in FIG. 3, the partial vacuum causes the external pipe 37 to be drawn into the mold recesses 32 so as to bear against said mold recesses 32. In this process, a partial vacuum is applied to the gas gap 30. At the same time, a low overpressure p1 of 0.2 to 0.4 bar above atmospheric is applied to the gas duct 24. The partial vacuum in the internal tube 39 causes the internal tube 39 to remain on the calibrating mandrel 25, in other words it is calibrated while being welded together with the external tube 37. The low overpressure between the external tube 37 and the internal tube 39 ensures that the internal tube 39 does not bulge outwards during cooling of the tubes 37, 39 which are welded together at the corrugation troughs 40 to form the corrugated compound pipe 10. When the tubes 37, 39 cool down, the pressure between them will reduce approximately to atmospheric pressure. During this production of the normal corrugated compound pipe 10, each of the extruders 1, 2 runs at a given speed n1,1 and n2,1, in other words each of them extrudes a constant mass flow of plastic melt per unit time.

When the transition portion 44 moves into the vicinity of the outer die 22 at the instant illustrated in FIG. 3, the switching member 48 arrives in front of the switch 49 which then transmits the already mentioned reference signal to the control system 50. Said control system 50 actuates the drive motor 3' of the extruder 2 in such a way that the speed n2 thereof is reduced from n2,1 to a speed n2,2. This causes the extrusion rate of the extruder 2, i.e. the mass flow of plastic melt per unit time, to be reduced. The reduction of the speed n2 of the extruder 2 from n2,1 to n2,2 therefore has the effect that the external tube 37, which comes to rest at the transition portion 44 of the socket recess 42, receives less plastic material than in the vicinity of the normal corrugated compound pipe 10 where it is molded into an external tube having transverse grooves 38.

When the half shells 12, 12' have moved on far enough to a position which approximately corresponds to that shown in FIG. 4 so that the external tube 37, which is extruded from the outer die 22, bears against the substantially cylindrical wall 43 of the socket recess 42, the speed n2 of the extruder 2 for the external tube 37 can be changed again, namely from n2,2 to n2,3 so as to adapt the melt flow in the virtually cylindrical portion of the socket recess 42 to the desired shape of the socket recess 41. In the further molding process of the external tube 37 in the wall 43 of the socket recess 42, the speed n2 of the extruder 2 can be changed again, for instance in order to provide a sufficient amount of melt for producing reinforcing corrugations 52 (see FIG. 6).

Figure 5:
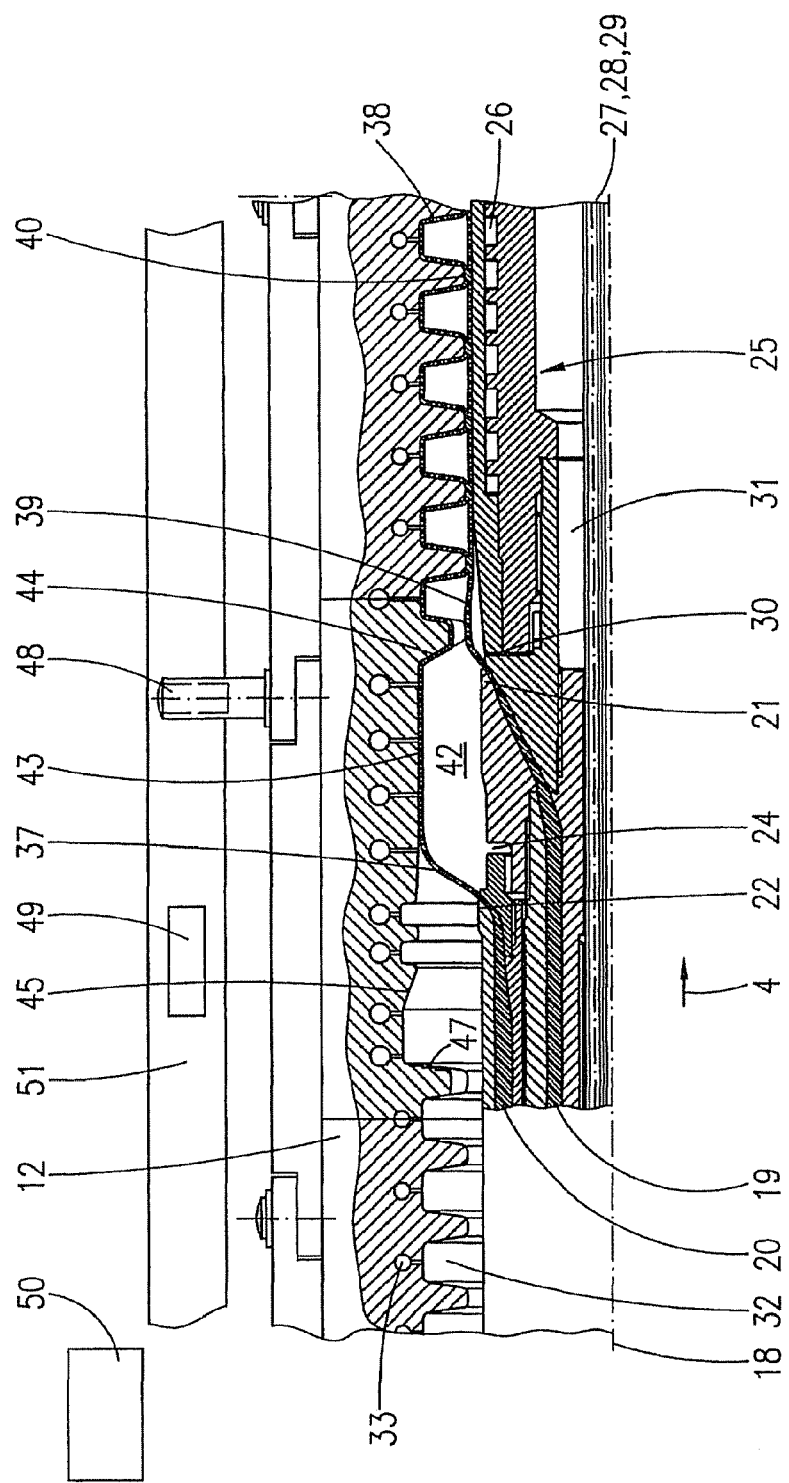

When the transition portion 44 reaches the vicinity of the inner die 21 according to FIG. 5, the extruder speed n1 of the extruder 1 extruding the internal tube 39 is increased from the above-mentioned normal speed n1,1 to n1,2 so as to extrude a greater mass flow of plastic melt per unit time. At the same time, the gas gap 30 is no longer exposed to partial vacuum but to compressed air with an overpressure p2 of for instance 0.1 to 0.45 above atmospheric. Furthermore, the overpressure p1 is at this instant removed from the gas duct 24 which is then connected to a vacuum source or to atmosphere so that the gap between internal tube 39 and external tube 37 is vented in the region of the socket recess 42, causing the internal tube 39 to be pressed outwards against the external tube 37. The thickening of the internal tube 39 in the region of the transition portion 44 ensures that the internal tube 39 consisting of plastic melt does not tear when the diameter is rapidly increased.

Figure 6:
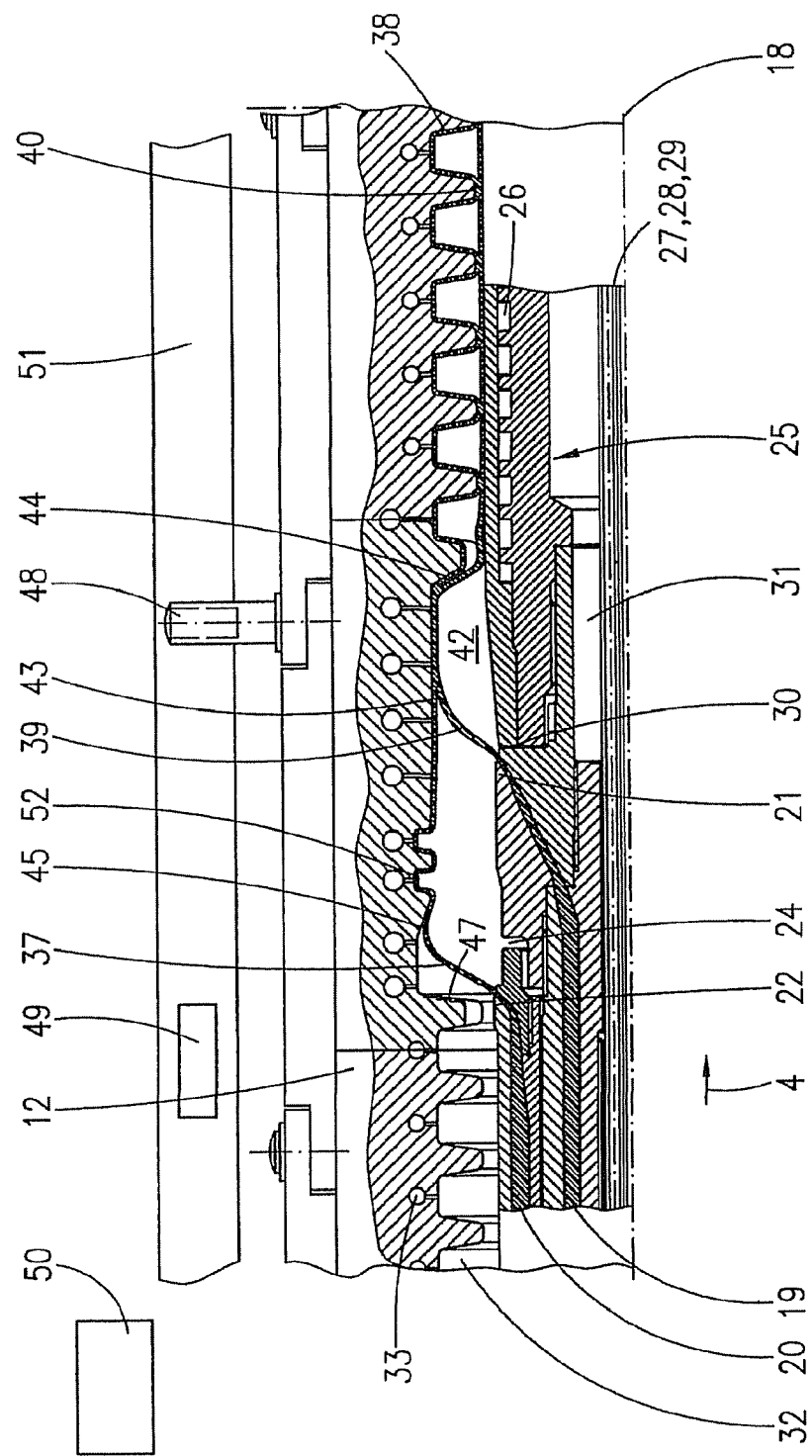

While the internal tube 39 is being molded—substantially according to FIG. 6—to form the pipe socket 41 in the region of the substantially cylindrical wall portion 43 of the socket recess 42, the extruder speed n1 is reduced from the increased speed n1,2 to a speed n1,3 which is however still greater than the normal speed n1,1. At this instant, while the extruder speed n1 of the extruder 1 is being reduced from n1,2 to n1,3, the pressure p2 of the gas exiting the gas gap 30 may at the same time be slightly reduced to an overpressure p3 as the molding of the internal tube 39, which requires slightly more pressure, in the region of the transition portion 44 is finished. During the production of the expanding insert end 46 of the socket pipe 41, the speed n1 of the extruder 1 forming the internal tube 39 may be increased again to a speed n1,4 so as to make the insert end 46 sufficiently stable.

Alternatively or in particular cumulatively, the speed n2 of the second extruder for the production of the external tube 37 may be changed as well, namely from a speed n2,1 during the production of the normal compound pipe 10 having transverse grooves 38 to a speed n2,2 during the production of the transition portion 44, with n2,2>n2,1. While the external tube 37 is molded—substantially according to FIG. 6—to form the pipe socket 41 in the region of the substantially cylindrical wall portion 43 of the socket recess 42, the extruder speed n2 is reduced from the generally increased speed n2,2 to a speed n2,3, with n2,3<n2,1.

As soon as the half shells 12, 12' have reached the positions according to FIG. 7, in other words as soon as the molding of the socket pipe 41 is finished, all operational parameters are reset to the normal conditions as prior to the production of the pipe socket.

The signals triggering the individual changes in relation to the movement of the half shells 12, 12' are stored in the control system 50. The reference signal, which is released at the beginning by the switch 49, is sufficient for the individual change sequences to be triggered at the right time.

What is claimed is:

1. A method for the continuous production of a plastic compound pipe (10) comprising a pipe socket (41), the plastic compound pipe (10) consisting of a smooth internal pipe and an external pipe which is welded together therewith and is provided with transverse grooves (38), wherein half shells (12, 12') are guided in circulation and in a direction of conveyance (4), which half shells (12, 12') are provided with annular mold recesses (32) and combine in pairs on a molding path (16) to form a mold with a central longitudinal axis (18);

wherein at least one pair of half shells (12, 12') is provided with a socket recess (42), the socket recess (42) having a substantially cylindrical wall (43);

wherein a relative overpressure is generated which acts from an inside to an outside;

wherein a die head (8) of a first extruder (1) comprising a drive motor (3) is disposed upstream of the molding path (16);

wherein the die head (8) is provided with an outer die (22) and with an inner die (21) arranged downstream in the direction of conveyance (4) and with a calibrating mandrel (25) at its downstream end when seen in the direction of conveyance (4);

wherein the inner die (21) is connected to the first extruder (1);

wherein a second extruder (2) comprising a drive motor (3') is provided which is connected to the outer die (22);

wherein an internal tube (39) of plastic melt is extruded from the inner die (21), wherein an external tube (37) of plastic melt is extruded from the outer die (22);

wherein the drive motors (3, 3') are actuated in such a way that an extruder speed n1 of the first extruder (1) is increased from a speed n1, 1 during the production of the compound pipe consisting of a smooth internal pipe and an external pipe with transverse grooves (38)

to a speed n1,2 while an expanding transition portion (44) of the socket recess (42) is moving across the inner die (21); and that the extruder speed of the first extruder (1) is then reduced to a speed n1,3 while the substantially cylindrical wall (43) of the socket recess (42) is being moved across the inner die (21), wherein n1,2>n1,3>n1,1 applies.

2. A method according to claim 1 wherein during the production of the compound pipe consisting of a smooth internal tube and an external tube which is welded together therewith and which is provided with transverse grooves (38), the extruder speed n2 of the second extruder (2) is reduced from a speed n2,1 to a speed n2,2 while the transition portion (44) is being guided across the outer die (22).

3. A method according to claim 1, wherein an additional gas gap (30) leads out between inner die (21) and calibrating mandrel (25) and opens into the internal tube (39), with compressed air of various pressures being applicable to said gas gap (30); and wherein the pressure is increased from a partial vacuum p1 while the smooth-wall internal tube is being formed to a pressure p2 while the transition portion (44) is moving across the inner die (21) and that the pressure is then reduced to a pressure p3 while the socket recess (42) is being moved across the inner die (21), wherein p1<p3<p2 applies.

4. A method for the continuous production of a plastic compound pipe (10) comprising a pipe socket (41), the plastic compound pipe (10) consisting of a smooth internal pipe and an external pipe which is welded together therewith and is provided with transverse grooves (38), wherein half shells (12, 12') are guided in circulation and in a direction of conveyance (4), which half shells (12, 12') are provided with annular mold recesses (32) and combine in pairs on a molding path (16) to form a mold with a central longitudinal axis (18);

wherein at least one pair of half shells (12, 12') is provided with a socket recess (42), the socket recess (42) having a substantially cylindrical wall (43);

wherein a relative overpressure is generated which acts from an inside to an outside;

wherein a die head (8) of a first extruder (1) comprising a drive motor (3) is disposed upstream of the molding path (16);

wherein the die head (8) is provided with an outer die (22) and with an inner die (21) arranged downstream in the direction of conveyance (4) and with a calibrating mandrel (25) at its downstream end when seen in the direction of conveyance (4);

wherein the inner die (21) is connected to the first extruder (1);

wherein a second extruder (2) comprising a drive motor (3') is provided which is connected to the outer die (22);

wherein an internal tube (39) of plastic melt is extruded from the inner die (21), wherein an external tube (37) of plastic melt is extruded from the outer die (22);

wherein the drive motors (3, 3') are actuated in such a way that an extruder speed n1 of the first extruder (1) is increased from a speed n1,1 during the production of the compound pipe consisting of a smooth internal pipe and an external pipe with transverse grooves (38) to a speed n1,2 while an expanding transition portion (44) of the socket recess (42) is moving across the inner die (21); and that the extruder speed of the first extruder (1) is then reduced to a speed n1,3 with the substantially cylindrical wall (43) of the socket recess (42) is being moved across the inner die (21), wherein n1,2>n1,3>n1,1 applies wherein an additional gas gap (30) leads out between the inner die (21) and the calibrating mandrel (25) and opens into the internal tube (39), with compressed air of various pressures being applicable to said gas gap (30); and wherein the pressure is increased from a partial vacuum p1 while the smooth-wall internal tube (39) is being formed to a pressure p2 while the transition portion (44) is moving across the inner die (21); and wherein the pressure is then reduced to a pressure p3 while the socket recess (42) is being moved across the inner die (21), wherein p1<p3<p2 applies.

5. A method according to claim 4, wherein the extruder speed n1 of the first extruder (1) is increased to an extruder speed n1,4 while an outwardly expanding mold portion (45) of the socket recess (42) is being guided across the inner die (21) for forming an insert end (46) of the socket recess (41), wherein n1,2>n1,4>n1,1 applies.

6. A method according to claim 4 wherein an extruder speed n2 of the second extruder (2) is changed from a speed n2,1 to a speed n2,2 during the production of the compound pipe consisting of the smooth internal tube and an external tube which is welded together therewith and which is provided with transverse grooves (38), to which speed n2,2 applies n2,2≧n2,1; and wherein the extruder speed n2 of the second extruder (2) is then changed to a speed n2,3, wherein n2,3≦n2,1 applies.

7. A method for the continuous production of a plastic compound pipe (10) comprising a pipe socket (41), the plastic compound pipe (10) consisting of a smooth internal pipe and an external pipe which is welded together therewith and is provided with transverse grooves (38), wherein half shells (12, 12') are guided in circulation and in a direction of conveyance (4), which half shells (12, 12') are provided with annular mold recesses (32) and combine in pairs on a molding path (16) to form a mold with a central longitudinal axis (18);

wherein at least one pair of half shells (12, 12') is provided with a socket recess (42), the socket recess (42) having a substantially cylindrical wall (43);

wherein a relative overpressure is generated which acts from an inside to an outside;

wherein a die head (8) of a first extruder (1) comprising a drive motor (3) is disposed upstream of the molding path (16);

wherein the die head (8) is provided with an outer die (22) and with an inner die (21) arranged downstream in the direction of conveyance (4) and with a calibrating mandrel (25) at its downstream end when seen in the direction of conveyance (4);

wherein the inner die (21) is connected to the first extruder (1);

wherein a second extruder (2) comprising a drive motor (3') is provided which is connected to the outer die (22);

wherein an internal tube (39) of plastic melt is extruded from the inner die (21), wherein an external tube (37) of plastic melt is extruded from the outer die (22);

wherein the drive motors (3, 3') are actuated in such a way that an extruder speed n2 of the second extruder (2) is increased from a speed n2, 1 during the production of the compound pipe (10) consisting of a smooth internal pipe and transverse grooves (38) to a speed n2,2 while an expanding transition portion (44) of the socket recess (42) is moving across the outer die (22); and that the extruder speed of the second extruder (2) is then reduced to a speed n2,3 while the substantially cylindrical wall (43) of the socket recess (42) is being moved across the outer die (22), wherein n2,2>n2,1>n2,3 applies.

* * * * *